Sept. 27, 1966　　　　　　J. F. WRIGHT　　　　　　3,274,710
FORK STRUCTURES FOR PIVOTAL ATTACHMENT TO VEHICLE MOUNTED BOOMS
Original Filed Dec. 10, 1962　　　　　　　　　　　　3 Sheets-Sheet 3
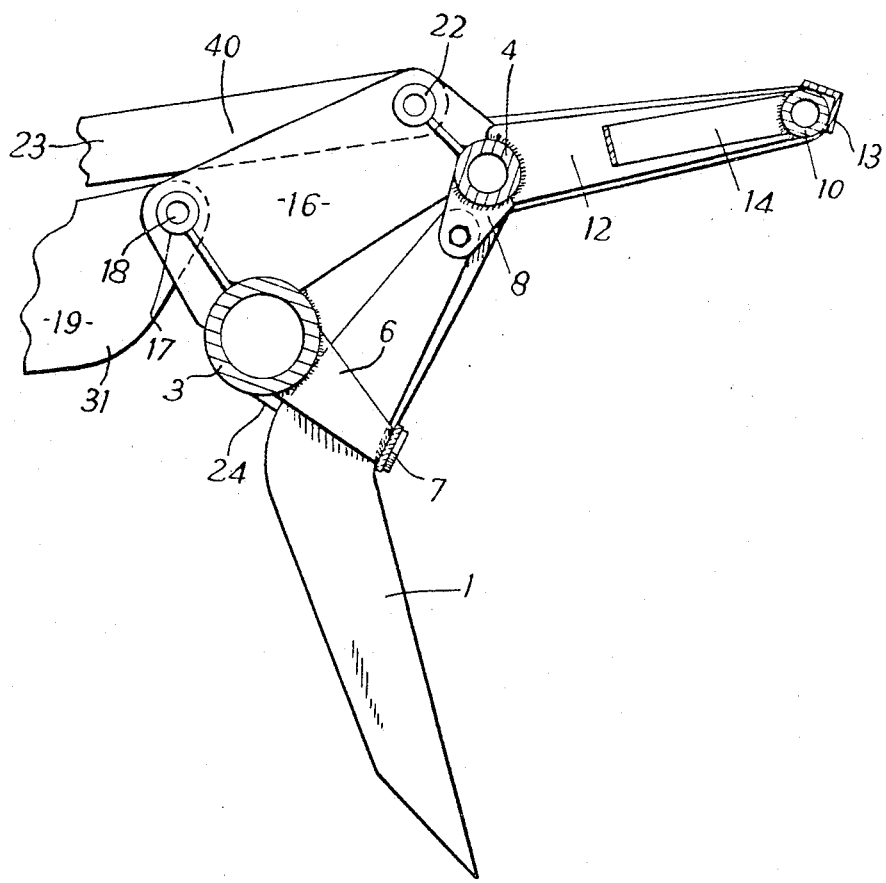

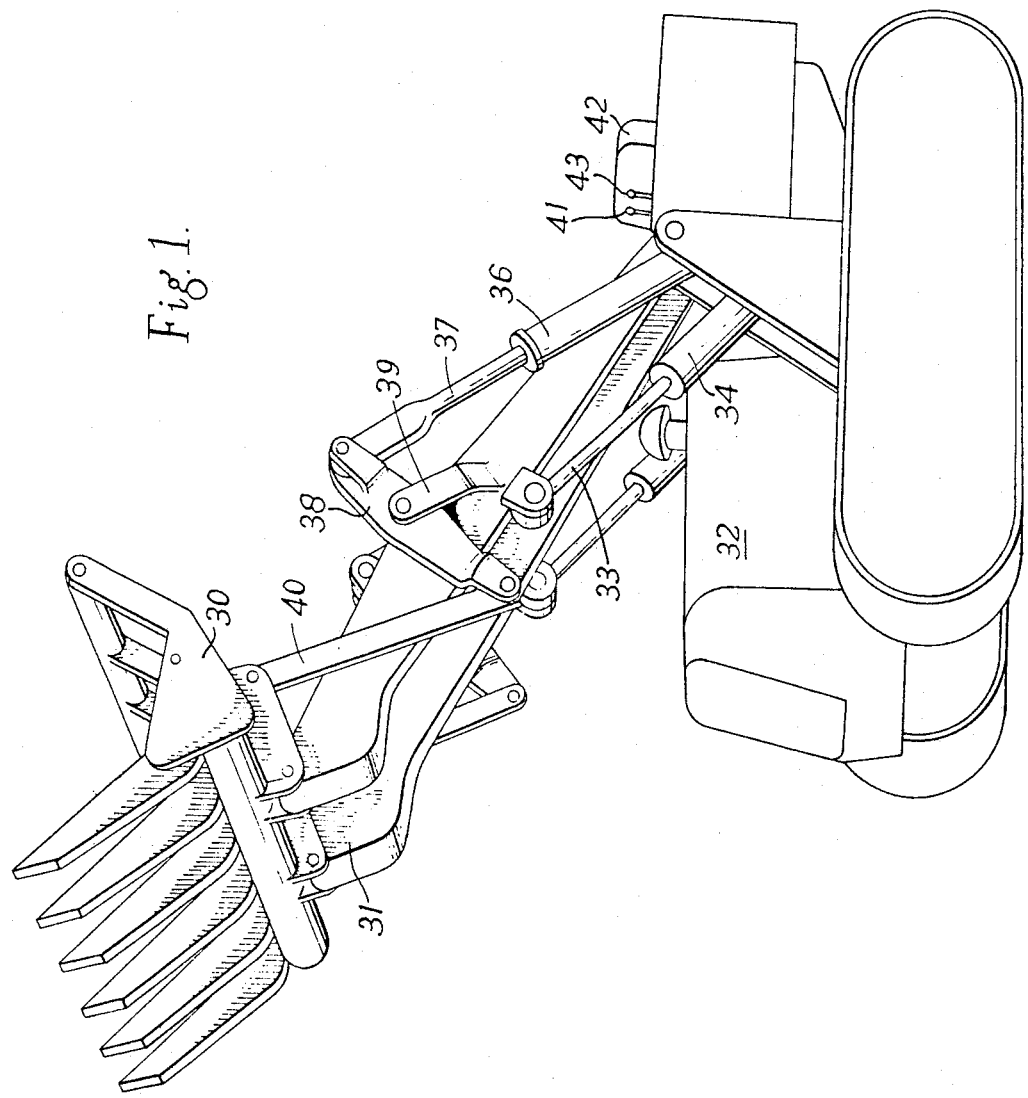

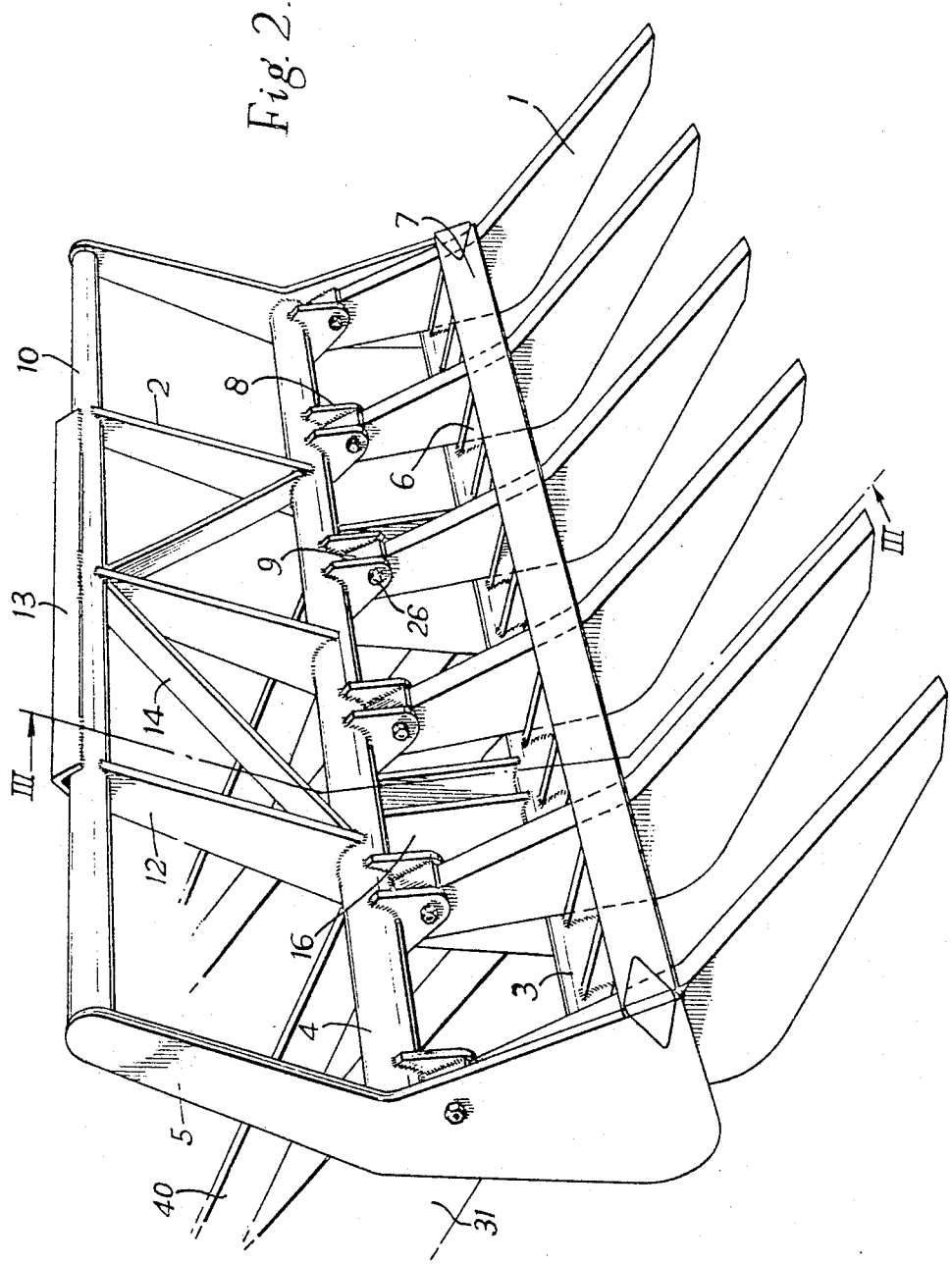

United States Patent Office 3,274,710
Patented Sept. 27, 1966

3,274,710
FORK STRUCTURES FOR PIVOTAL ATTACHMENT
TO VEHICLE MOUNTED BOOMS
John Frederick Wright, White Owl, Hinton Martell,
Wimbourne, Dorset, England
Continuation of application Ser. No. 243,475, Dec. 10,
1962. This application Jan. 5, 1965, Ser. No. 423,508
12 Claims. (Cl. 37—2)

This application is a continuation of my prior application Serial No. 243,475, filed on December 10, 1962 and now abandoned.

This invention relates to combinations including a tractor and a digging and carrying fork structure pivotally mounted on the tractor.

In the clearance of vegetation from land it is known to use a power-operated shovel for picking up the undergrowth and smaller vegetation, rubbish, and even felled trees, and transporting them to a disposal location for burning. Such a shovel is also used for clearing bricks and rubble from a site during the demolition of buildings.

The shovel is usually attached to a boom which extends from the front of, suitably, a tracked vehicle and which is movable in a vertical plane by hydraulic means. Rotation of the shovel about the end of the boom is effected by means of link members which are also hydraulically operated.

One disadvantage of using power-operated shovels for clearing vegetation from land is that they pick up earth which clings to the roots of the vegetation, thus considerably lengthening the time necessary for disposal by burning and removing valuable top-soil from the land. This is especially so if there are any roots of large trees present.

The present invention consists in a combination of a tractor, a boom pivotally mounted on the tractor, means for effecting rotation of the boom relative to the tractor, a digging and carrying fork structure pivotally attached to the boom, articulating means adapted to effect rotation of the fork structure relative to the boom, means mounted on the tractor, within reach of a driver thereof, for controlling the operation of the articulating means and the means for rotating the boom, the digging and carrying fork structure comprising a frame having parallel frame members, parallel extending tines, each having one end part connected to a first of the parallel frame members, an intermediate part connected to a second of the frame members, and another end part opposite said one end part projecting from said second frame member on the side thereof opposite said first frame member, the frame and tines presenting in side view a dish-shaped form, mounting means secured to the frame and pivotally connected to the boom, and connecting means secured to the frame and pivotally connected to the articulating means, whereby a driver of the tractor may, by operating the control means, move the structure between a lowered position in which the said other end parts are forwardly and downwardly inclined relative to the ground in an attitude suitable for digging purposes and a position in which the structure is raised from the ground and the said other end parts are upwardly and forwardly inclined so that the structure assumes an attitude suitable for carrying purpose.

The invention will now be described, by way of example, with reference to the accompanying drawings, in which:

FIGURE 1 is a perspective view of a combination according to the invention with the fork structure in its carrying position;

FIGURE 2 is a perspective view of the fork structure of FIGURE 1 in its digging position; and FIGURE 3 is a vertical section along the line III—III of FIGURE 2.

In FIGURE 1 of the drawings a digging and carrying fork structure 30 is pivotally attached to the forward ends of two booms 31 which are pivotally mounted at their rearward ends on opposite sides, respectively, of a tractor 32.

Each boom 31 is connected at an intermediate part thereof to an operating element 33 of a hydraulic ram 34 and, upon operation of this ram, is pivoted in a vertical plane relative to the tractor. The booms 31 can be moved in this manner between the positions shown in FIGURE 1, in which the booms extend upwardly and forwardly from the tractor 32, and lowered positions, in which they extend forwardly and downwardly therefrom.

Associated with the booms 31 are further hydraulic rams 36 which are also pivotally mounted on the tractor and are used for articulating the fork structure 30 relative to the ends of the booms 31. To this end an operating element 37 of each ram 36 is coupled to one end of a first link member 38 which is pivoted, at an intermediate location thereof, on a pin which is supported between a boom 31 and a bracket 39 secured thereto. At its end remote from the operating element 37 the first link member 38 is pivotally connected to one end of a second link member 40 whose other end is pivotally secured to the fork structure 30.

Flow of fluid to hydraulic rams 34, to effect movement of the booms 31 relative to the tractor 32, is controlled by means of a first control lever 41 which is disposed close to a seat 42 for the driver of the tractor. Hydraulic rams 36 for effecting articulation of the fork structure 30 relative to the booms 31 are likewise controlled by means of a second control lever 43 which is also disposed close to the seat 42. By operating levers 41 and 43 in a manner described hereinafter the fork structure 30 can be moved from a carrying position, as shown in FIGURE 1 of the drawings, to a lowered position in which it assumes an attitude suitable for digging, as shown in FIGURE 2.

As shown in FIGURE 2, the fork structure 30 includes six tines 1 which are mounted on a frame having a first frame member 4 connected to a second frame member 3 by end plates 5. Frame members 3 and 4 are tubular and of circular cross-section.

Welded to the second frame member 3 are a number of guide members 6, which are of length approximately equal to the diameter of the second frame member. These guide members are arranged in pairs with the spacing between the two members of a pair equal to the thickness of an intermediate part of a tine 1. Each end plate 5 extends from the second frame member 3 by an amount equal to the length of the guide members 6 and the end plates and ends of the guide members remote from the second member 3 are welded to a cross-plate 7 which extends parallel to the second member 3.

Each tine 1 is situated with an intermediate part between a pair of guide members 6 and an end part secured by a bolt 26 to a pair of apertured lugs 8 which are welded to the first frame member 4. Removal of a single bolt 26 therefore enables a tine to be withdrawn from the structure for replacement purposes. A keep plate 9 is disposed between each pair of lugs 8, the sides of the plate being welded to respective lugs of the pair and one end thereof being welded to the first frame member 4. In use of the structure engagement of the projecting end of a tine with an obstruction tends to cause pivotal movement of the tine about the second frame member 3. The keep plate 9 assists the bolt between the lugs 8 in preventing this movement and thereby results in a lower shearing force being exerted on the bolt itself.

The tines are of such shape that with their intermediate parts and end parts secured to the first and second frame members, respectively, in the manner described their other ends are inclined to present in side view a dish-shaped form. Suitably, the six tines are spaced apart at intervals of about one foot.

On the side of the first frame member 4 remote from the second member 3 and situated parallel thereto, is a third frame member 10. These two are rigidly connected together by means of connecting plates 12 disposed perpendicular to the first and third frame members. An angle part 13 is mounted as by welding on a central portion of the third frame member 10 and tendency to axial movement of the third frame member is inhibited by struts 14 welded to the first and third frame members at an inclination relative to the connecting plates 12.

Extending from the frame 2 in a direction away from the tines, and further connecting together the second and first frame members 3 and 4, respectively, are two cross-pieces each of which includes two parallel plates 16 depending from the tubular first and second frame members. Close to the second frame member 3 the plates 16 of each cross-piece are formed with aligned apertures 17 for receiving a pin 18, whereby the forked structure is pivotally attached to a front end part of a boom 31. Close to the first frame member 4, the parallel plates 16 of each cross-piece are formed with further aligned apertures 22 for pivotal connection of the forked structure to the second link member 40 associated with the boom, whereby the forked structure can be rotated relative to the boom.

Welded upon the second frame member 3 between each pair of sleeve members 6 is a triangular abutment 24 which serves to inhibit pivotal movement of the corresponding time relative to its point of support on the first frame member 4 when the tine is engaged with an obstruction.

In operation, the fork structure 30 and tractor 32 are used to clear a site in the following manner.

First in order to clear trees the booms 31 are positioned horizontally, or approximately so, by operation of hydraulic rams 34 under the control of lever 41. The fork structure is then rotated relative to the boom by operating the control lever 43 until the structure assumes a position in which the member 10 is disposed forwardly of the front of the tines 1. The vehicle is then driven towards the tree so that the third frame member, or rather the angle part 13 thereon is driven against the tree and effects uprooting, the angle part engaging the bark of the tree and preventing the fork structure from "riding up" the trunk.

The vehicle is then withdrawn, the boom lowered by means of control lever 41 and the fork structure is rotated by lever 43 to a position in which the tines 1 slightly enter the ground and the vehicle is then driven forwards so that the tines 1 become firmly engaged with the tree roots. The booms 31 are then raised slightly and the lever 43 which serves to effect rotation of the forked structure is rapidly moved to and fro, thereby imparting vibration to the fork structure which effects release of some of the earth adhering to the tree roots. Lever 43 is then operated to rotate the fork structure relative to the booms 31 so as to release the tree roots and the tree falls to the ground, the force of the impact releasing further earth from the roots.

Next, the booms are lowered and the tines 1 are engaged between the tree and the ground. The fork structure is then rotated so as to position the tree on the frame thereof between the projecting parts of the tines and the connecting plates. The booms are then raised to the position shown in FIGURE 1 of the drawings by operating the lever 41 and the vehicle is driven to the disposal point. At the disposal point the cleared debris from the site is burned on a bonfire and loads carried on the fork structure can be deposited in a central crater of the fire by raising the boom and positioning the fork structure over the central crater of the fire. The fork structure is then rotated to discharge its contents into the fire.

Other vegetation and debris is cleared from the site by moving the vehicle forwards into engagement with the vegetation and debris with the tines shallowly engaged in the ground and when the tines are firmly engaged therewith the fork structure is rotated to pick up the load which is freed of earth and disposed of in the manner already described.

It will be appreciated that in uprooting trees and clearing other vegetation in the manner described above the tines can be engaged with the ground and then disengaged therefrom without removing a substantial amount of valuable topsoil. The use of tubular members of circular section for the frame members 3 and 4 likewise means that less topsoil is removed than would be the case with members of rectangular section.

In demolition work the walls of a building can be knocked down by means of the angular part 13 on the third frame member 10 and the foundations dug out by means of the tines, in a similar manner to that described above for uprooting trees. The structure can then be used for carrying the remains of the wall to a waiting lorry.

The structure can likewise be used in other industries where it is necessary to pick up heavy loads and transport them over rough ground, for example in moving large blocks of stone from the face of a quarry, transporting girders across a building site, or pipes during pipe-laying operations over the countryside.

All of the above operations can be carried out from the driving seat of the tractor by means of control levers 41 and 43 and the usual driving controls of the tractor itself. In particular it will be appreciated that clearance of a site involving felling trees, digging up their roots and transport of the tree and other vegetation to a disposed point can be effected by means of a single fork structure and tractor and that these operations can all be effected by the driver from his seat on the tractor.

I claim:
1. In combination a tractor, a boom pivotally mounted on said tractor, means for effecting rotation of said boom relative to said tractor, a digging and carrying fork structure pivotally attached to said boom, articulating means adapted to effect rotation of said fork structure relative to said boom, means mounted on said tractor, within reach of a driver thereof, for controlling the operation of said articulating means and said means for rotating said boom, said digging and carrying fork structure presenting in side view a dish-shaped form and comprising parallel frame members, parallel extending tines, means for releasably securing said tines to said parallel frame members so that one end part of each tine is connected to a first of said parallel frame members, an intermediate part is held between a second of said parallel frame members and a retaining bar parallel to said second frame member, and another end part projects from said second frame member on the side thereof opposite said first member, said securing means comprising pairs of apertured lugs secured to said first frame member, the said one end part of each said tine being disposed between a pair of said apertured lugs and formed with an aperture in alignment with the apertures in said lugs, a bolt which extends through said aligned apertures to secure the said one end part of said tine relative to said first frame member, mounting means secured to said frame and pivotally connected to said boom, and connecting means secured to said frame and pivotally connected to said articulating means, whereby a driver of said tractor may, by operating said control means, move the structure between a lowered position in which the said other end parts are forwardly and downwardly inclined relative to the ground in an attitude suitable for digging purposes and a position in which the structure is raised from the ground and the said other end parts are upwardly and forwardly inclined so that the structure assumes an attitude suitable for carrying purposes.

2. A combination as claimed in claim 1, wherein a third parallel frame member is located on the side of the first frame member remote from the second frame member, the frame members being so arranged that the frame presents in side view a dish-shaped form and in plan view an open construction between the first and third frame members.

3. A combination as claimed in claim 2, wherein the three frame members are tubular and of circular section, and a plate of angle section is secured to the third frame member, which, upon articulation of the structure to a position in which the third frame member is disposed forwardly of the first and second frame members and the tines, can be used for demolition or uprooting purposes.

4. A combination as claimed in claim 1, wherein the said other end part of each tine is inclined relative to the said one end part so that the tines present in side view a dash-shaped form.

5. A combination as claimed in claim 1, wherein the mounting means comprises two sets of mounting plates which extend between the first and second frame members, each set comprising two parallel plates respectively formed with first aligned apertures for pivotal attachment of the structure to the vehicle boom and second aligned apertures for attachment of the structure to the articulating means.

6. A combination as claimed in claim 1, comprising a keep plate extending between each pair of apertured lugs and engaging the said one end part of a tine, the keep plates being adapted to assist the bolts in substantially preventing movement of the said one end parts relative to the first frame member when the tines are subjected to a force tending to cause pivotal movement about their attachment to the second frame member during digging.

7. A combination as claimed in claim 1, wherein the releasable securing means comprise parallel guide means extending from the second frame member and adapted to receive an intermediate part of each tine, whereby said tine may be removed from the fork structure by removing the bolt at one end thereof and slidably removing said tine from said guide means.

8. A combination as claimed in claim 7, wherein the outer ends of the guide means are secured to the retaining bar.

9. A combination as claimed in claim 8, wherein a triangular abutment element is secured to the second frame member between each pair of guide members and extends on the side of the second frame member remote from the first frame member to bear against the said other end part of the tine and inhibit pivotal movement of the tine about its attachment to the first frame member.

10. A digging and carrying fork structure for digging in the ground and also carrying large objects while permitting smaller objects to pass therethrough, comprising: a plurality of parallel frame members, a plurality of parallel extending tines mounted perpendicular to said frame members, said frame members and tines presenting a generally dish-shaped form in side view, means for releasably securing said tines to said parallel frame members so that one end part of each tine is connected to a first of said parallel frame members, an intermediate part is held between a second of said parallel frame members and a retaining bar parallel to said second frame member, and another end part projects from said second frame member on the side thereof opposite said first frame member, said securing means comprising pairs of apertured lugs secured to said first frame member, the said one end part of each said tine being disposed between a pair of said apertured lugs and formed with an aperture in alignment with said aligned apertures of said lugs, a bolt which extends through said aligned apertures of said lugs and said tine to secure the said one end part of said tine relative to said first frame member.

11. A combination in accordance with claim 10 wherein the releasable securing means comprise parallel guide means extending from the second frame member and adapted to receive an intermediate part of each tine, whereby said tine may be removed from the fork structure by removing the bolt at one end thereof and slidably removing said tine from said guide means.

12. A combination as claimed in claim 11 wherein the outer ends of the guide means are secured to the retaining bar.

References Cited by the Examiner

UNITED STATES PATENTS

| | | | |
|---|---|---|---|
| 2,081,192 | 5/1937 | Allin et al. | 37—2 |
| 2,303,379 | 12/1942 | Mork | 37—117.5 |
| 2,473,505 | 6/1949 | Brock | 37—117.5 |
| 2,597,374 | 5/1952 | Richey | 37—117.5 |
| 2,672,994 | 3/1954 | Werner et al. | 37—117.5 |
| 2,932,100 | 4/1960 | Goethe | 37—2 |
| 2,993,608 | 7/1961 | Womble | 37—117.5 |
| 3,034,237 | 5/1962 | Wolfe et al. | 37—117.5 |
| 3,090,138 | 5/1963 | Dudley | 37—2 |
| 3,109,248 | 11/1963 | Vos | 37—117.5 |

ABRAHAM G. STONE, *Primary Examiner.*

R. L. HOLLISTER, F. B. HENRY, *Assistant Examiners.*